US008769681B1

(12) United States Patent
Michels et al.

(10) Patent No.: US 8,769,681 B1
(45) Date of Patent: Jul. 1, 2014

(54) METHODS AND SYSTEM FOR DMA BASED DISTRIBUTED DENIAL OF SERVICE PROTECTION

(75) Inventors: Tim Michels, Seattle, WA (US); Paul Szabo, Seattle, WA (US); Bill Baumann, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 981 days.

(21) Appl. No.: 12/189,550

(22) Filed: Aug. 11, 2008

(51) Int. Cl.
*G06F 11/00* (2006.01)
*G06F 12/14* (2006.01)
*G08B 23/00* (2006.01)

(52) U.S. Cl.
USPC ............................................ 726/23; 713/193

(58) Field of Classification Search
USPC ...................................... 713/151; 726/22, 23
See application file for complete search history.

(56) References Cited

U.S. PATENT DOCUMENTS

| | | | |
|---|---|---|---|
| 5,941,988 A | 8/1999 | Bhagwat et al. | |
| 6,700,871 B1 | 3/2004 | Harper et al. | |
| 6,748,457 B2 | 6/2004 | Fallon et al. | |
| 6,820,133 B1 | 11/2004 | Grove et al. | |
| 7,065,630 B1 | 6/2006 | Ledebohm et al. | |
| 7,107,348 B2 | 9/2006 | Shimada et al. | |
| 7,142,540 B2 | 11/2006 | Hendel et al. | |
| 7,324,525 B2 | 1/2008 | Fuhs et al. | |
| 7,359,321 B1* | 4/2008 | Sindhu et al. | 370/230 |
| 7,376,772 B2 | 5/2008 | Fallon | |
| 7,403,542 B1 | 7/2008 | Thompson | |
| 7,420,931 B2 | 9/2008 | Nanda et al. | |
| 7,478,186 B1 | 1/2009 | Onufryk et al. | |
| 7,493,398 B2* | 2/2009 | Bush | 709/227 |
| 7,496,695 B2 | 2/2009 | Go et al. | |
| 7,500,028 B2 | 3/2009 | Yamagishi | |
| 7,647,416 B2 | 1/2010 | Chiang et al. | |
| 7,784,093 B2 | 8/2010 | Deng et al. | |
| 7,877,524 B1 | 1/2011 | Annem et al. | |
| 8,103,809 B1 | 1/2012 | Michels et al. | |
| 2001/0042200 A1* | 11/2001 | Lamberton et al. | 713/151 |
| 2002/0143955 A1 | 10/2002 | Shimada et al. | |
| 2003/0204636 A1 | 10/2003 | Greenblat et al. | |
| 2004/0249948 A1 | 12/2004 | Sethi et al. | |
| 2005/0050364 A1* | 3/2005 | Feng | 713/201 |

(Continued)

FOREIGN PATENT DOCUMENTS

| | | |
|---|---|---|
| EP | 1813084 A1 | 8/2007 |
| WO | 2006/055494 A1 | 5/2006 |

OTHER PUBLICATIONS

David Moore; Inferring Internet Denial-of-Service Activity; Year: ACM; May 2001; pp. 1-12.*

(Continued)

*Primary Examiner* — Mohammad W Reza
*Assistant Examiner* — Monjour Rahim
(74) *Attorney, Agent, or Firm* — LeClairRyan, a Professional Corporation

(57) ABSTRACT

A method and system for protection against denial of service attacks to a server coupled to a network. The server may establish connections with client computers through the network. Packets are received over the network directed to the server. It is determined whether the packets are associated with an established connection. The packets associated with the established connection are separated for processing by the server in a first buffer. The packets requesting a new connection are separated in a second buffer. The packets in the second buffer requesting a new connection are serviced at a lower priority than the packets relating to established connections.

15 Claims, 3 Drawing Sheets

(56) References Cited

U.S. PATENT DOCUMENTS

| | | | |
|---|---|---|---|
| 2006/0104303 A1 | 5/2006 | Makineni et al. | |
| 2006/0174324 A1* | 8/2006 | Zur et al. | 726/3 |
| 2006/0221832 A1 | 10/2006 | Muller et al. | |
| 2006/0221835 A1 | 10/2006 | Sweeney | |
| 2009/0007266 A1* | 1/2009 | Wu et al. | 726/22 |
| 2009/0016217 A1* | 1/2009 | Kashyap | 370/231 |

OTHER PUBLICATIONS

"Plan 9 kernel history: overview / file list / diff list," Last accessed, Oct. 22, 2007, pp. 1-16, (http://switch.com/cgi-bin/plan9history.cgi?f=2001/0126/pc/etherga620.com).

Alteon Websystems, "Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

"TCP—Transmission Control Protocol (TCP Fast Retransmit and Recovery)," EventHelix.com/EventStudio1.0, Mar. 28, 2002, pp. 1-5.

Harvey et al., "DMA Fundamentals on Various PC Platforms," National Instruments, Application Note 011, Apr. 1991,pp. 1-18.

Mangino, "Using DMA with High Performance Peripherals to Maximize System Performance," WW TMS470 Catalog Applications, Jan. 2007, (http://focus.ti.com/lit/wp/spna105/spna105.pdf).

Mogul, "The Case for Persistent-Connection HTTP," SIGCOMM, Oct. 1995, pp. 299-313, Cambridge, MA USA.

Rabinovich et al., "DHTTP: An Efficient and Cache-Friendly Transfer Protocol for the Web," IEEE/ACM Transactions on Networking, Dec. 2004, vol. 12 No. 6, pp. 1007-1020, IEEE.

Stevens, "TCP Slow Start, Congestion Avoidance, Fast Retransmit, and Fast Recovery Algorithms," Standards Track Memo, RFC: 2001, Jan. 1997, pp. 1-6.

Wadge, "Achieving Gigabit Performance on Programmable Ethernet Network Interface Cards," May 2001, pp. 1-9.

Welch, "A User's Guide to TCP Windows," Article, Jun. 1996, pp. 1-5.

Wikipedia, "Direct Memory Access," Oct. 2009, pp. 1-6, (http://en.wikipedia.org/wiki/Direct_memory_access).

Wikipedia, "Nagle's Algorithm," at Nagle's Algorithm, Last Modified Oct. 2009, (Wikeopedia.xps).

Bell Laboratories, "Layer 4/7 Switching and Other Custom IP Traffic Processing Using the NEPPI API," Bell Laboratories, Lucent Technologies, 2000, pp. 1-11, Murray Hill, NJ 07974 USA.

"Memory Mapping and DMA," Jan. 2005, Chapter 15, pp. 412-463, (http://lwn.net/images/pdf/LDD3/ch15.pdf).

"DMA and Interrupt Handling," EventHelix.com/EventStudio1.0, Oct. 2009, (http://www.eventhelix.com/RealtimeMantra/FaultHandling/dma_interrupt_handling.htm ).

Cavium Networks, "Cavium Networks Product Selector Guide—Single & Multi-Core MIPS Processors, Security Processors and Accelerator Boards," Spring 2008, pp. 1-44, Cavium Networks, Mountain View, CA, US, (www.caviumnetworks.com).

"Comtech AHA Announces 3.0 Gbps GZIP Compression/Decompression Accelerator—AHA362-PCIX offers high-speed GZIP compression and decompression," Apr. 20, 2005, pp. 1-2, Comtech AHA Corporation, Moscow, ID, USA, (www.aha.com).

"Comtech AHA Announces GZIP Compression and Decompression IC—Offers the highest speed and compression ratio performance in hardware on the market," Jun. 26, 2007, pp. 1-2, Comtech AHA Corporation, Moscow, ID, USA, (www.aha.com).

"PCI, PCI-X," Oct. 2008, Cavium Networks—Products > Acceleration Boards > PCI, PCI-X, (http://www.cavium.com/acceleration_boards_PCI_PCI-X.htm).

Cavium Networks, "NITROX™ XL Security Acceleration Modules PCI 3V or 3V/dV—Universal Boards for SSL and IPSec," 2002, pp. 1., Cavium Networks, Mountain View, CA, USA, (http://www.Caviumnetworks.com).

* cited by examiner

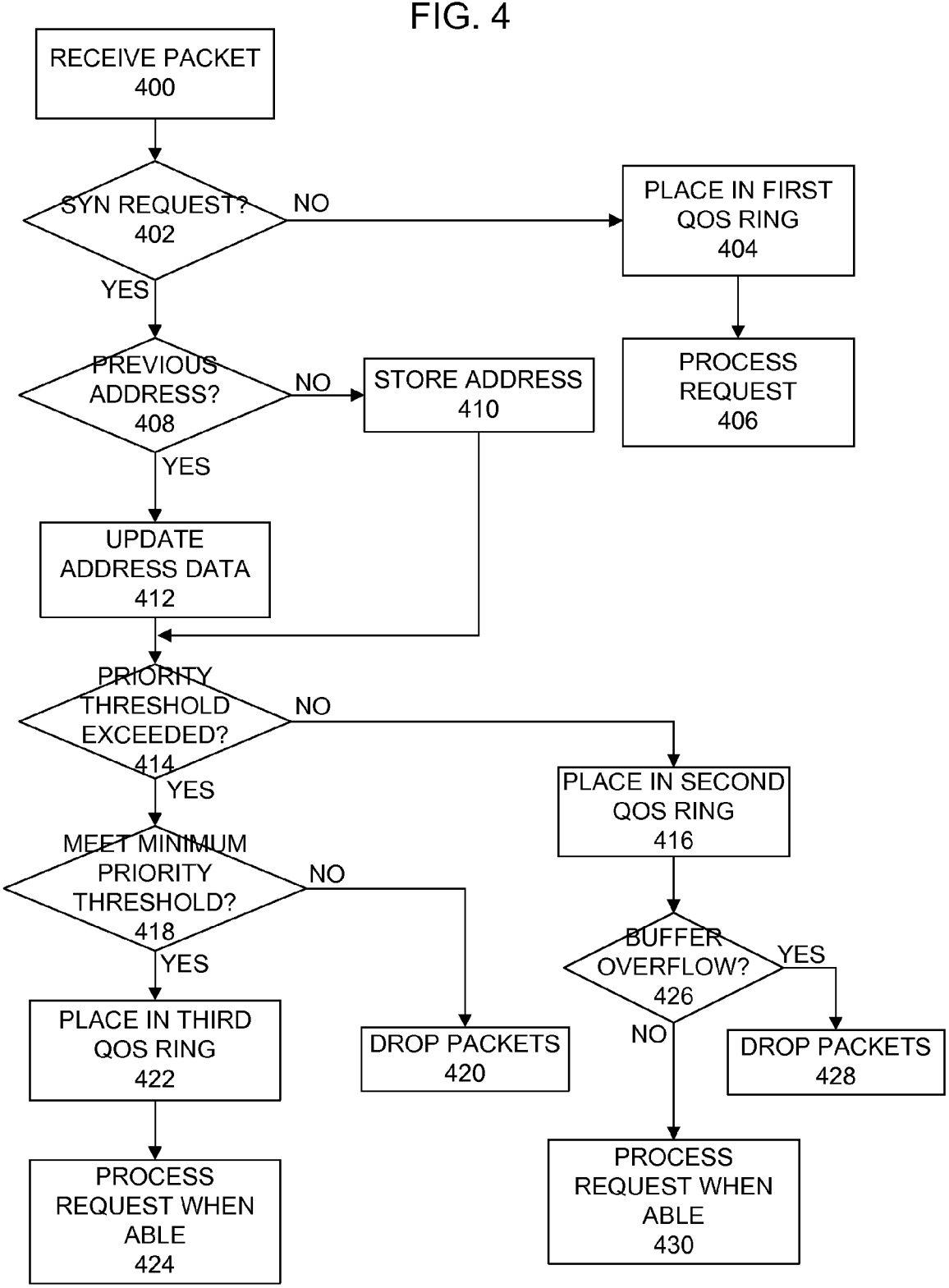

METHODS AND SYSTEM FOR DMA BASED DISTRIBUTED DENIAL OF SERVICE PROTECTION

FIELD OF THE INVENTION

This invention generally relates to protecting networks from denial of service attacks and more particularly, to a system and methods for prioritizing server resources to requests relating existing connections.

BACKGROUND

With the widespread use of web based applications and the Internet in general, concerns have been raised with the availability of servers against so-called denial of service attacks. A denial-of-service attack (DoS attack) or distributed denial-of-service attack (DDoS attack) is an attempt to make a computer server unavailable to its intended users. A denial of service attack is generally a concerted, malevolent effort to prevent an Internet site or service from functioning.

Denial of service attacks typically target sites or services hosted on high-profile web servers such as banks, credit card payment gateways and root servers. One common method of attack involves saturating the target machine with external communication connection requests such that it cannot respond to legitimate traffic, or responds so slowly as to be rendered effectively unavailable. In general terms, denial of service attacks are implemented by forcing the targeted server computer to reset, or consume its resources such that it can no longer provide its intended service and/or, obstructing the communication media between the intended users and the server so that they can no longer communicate adequately.

One particular denial of service attack over the Internet is a SYN based attack that sends a flood of Internet transmission control protocol (TCP) SYN packets, often with a false sender address. Each of these packets is handled like a connection request, causing the server to establish a half-open connection, by sending back a TCP/SYN-ACK packet, and waiting for a TCP/ACK packet in response from the sender address. However, because the sender address is forged, the response never comes. These half-open connections saturate the number of available connections the server is able to make, keeping it from responding to legitimate requests until after the attack ends. This consumes server CPU resources for the new connections, denying any further new connections, and effectively denying existing connections from service.

FIG. 2 shows a typical prior art server arrangement. FIG. 2 shows a network 200 that may be the Internet. The network 200 has a server 202 that receives requests from a client computer 204. It is to be understood that client computer 204 represents multiple client computers that may make requests to the server 202. In this example the requests are made in packets 206 having a header and a body according to the Transmission Control Protocol (TCP) of the Internet Protocol. The Internet Protocol allows the exchange of packets between network nodes such as the server 202 and the client computer 204. The header describes the packet's destination and packets originating from client computer(s) 204 are routed to the server 202 in this example. The requests are received by the server 202 and a response is sent back to the client computer 204. Initially, some of packets 206 include SYN requests that constitute requests for a connection between the client computer 204 and the server 202. Once a connection is established, further packets are may include requests for data or other requests for the server 202.

One type of denial of service attack involves sending multiple SYN request packets with no return addresses to the server 202. The sending of multiple SYN packets with bogus, random, otherwise invalid, return addresses is termed a stateless attack. Since the server 202 processes received packets in order, packets relating to existing connections (non-SYN packets) will be crowded out and not serviced, resulting in denial of service as shown in FIG. 2. Another form of denial of service attack is a stateful attack that sends SYN request with a return address and once an acknowledgement (ACK) is received from the server 202, no further responses are made therefore keeping a connection open and diverting server resources.

SUMMARY

According to one example, a method for protection against denial of service attacks to a server coupled to a network. The server has at least one established connection with a client computer. Packets are received over the network directed to the server. It is determined whether the packets are associated with the at least one established connection. The packets associated with the at least established connection are separated for processing by the server in a first buffer. The packets requesting a new connection in a second buffer are separated. The packets in the second buffer requesting a new connection are serviced at a lower priority than the packets relating to established connections.

Another example is a machine readable medium having stored thereon instructions for protection against denial of service attacks. The medium includes machine executable code which when executed by at least one machine, causes the machine to receive packets over the network directed to the server. The code also causes the machine to determine whether the packets are associated with the at least one established connection. The code causes the machine to separate the packets associated with the at least established connection for processing by the server in a first buffer. The code causes the machine to separate the packets requesting a new connection in a second buffer and service the packets requesting a new connection at a lower priority than other packets relating to established connections.

Another example is a secure server system coupled to a network allowing connection to a client computer. The system includes a network protection module including a first buffer, a second buffer, and an interface to receive packets from a client computer over the network. A server is coupled to the network protection module to process the packets. The network protection module receives packets over the network directed to the server and determines whether the packets are associated with the at least one established connection. The network protection module also separates the packets associated with the at least established connection for processing by the server in a first buffer and separates the packets requesting a new connection in a second buffer. The network protection module services the packets requesting a new connection at a lower priority than packets relating to established connections.

Additional aspects will be apparent to those of ordinary skill in the art in view of the detailed description of various embodiments, which is made with reference to the drawings, a brief description of which is provided below.

BRIEF DESCRIPTION OF THE DRAWINGS

FIG. 4 is a flow chart of methods for protecting against denial of service attacks performed by the example network protection module in FIG. 3.

Figure 1:
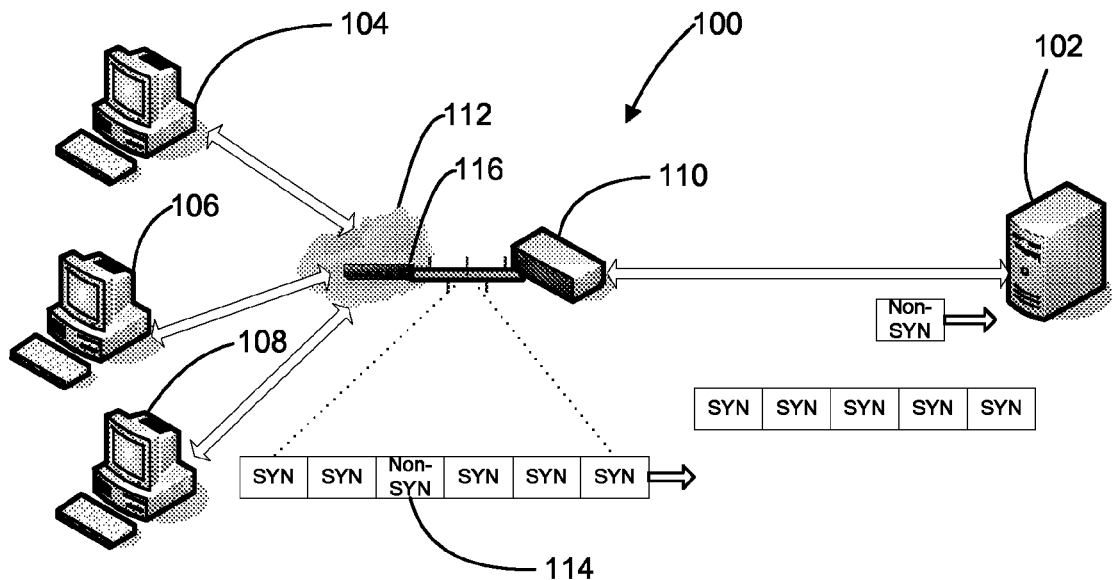
FIG. 1 is a block diagram of a network system using one example of an DMA based denial of service protection system.
Figure 2:
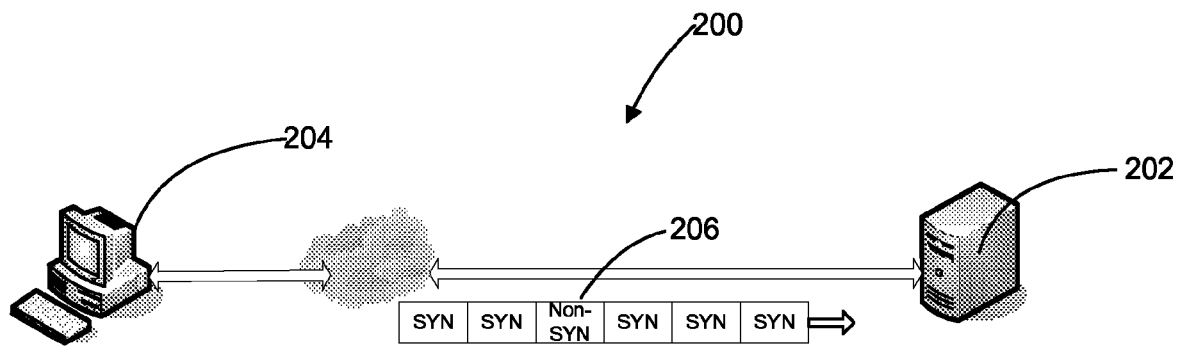
FIG. 2 is a block diagram of a prior art network system illustrating a denial of service attack against a server.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Currently, denial of service attacks exploit the server operation that follow standard processing of first in processing of packets. Thus servers ignore setting priorities for requests relating to already legitimate/existing connections. Severs are unable to process legitimate/existing requests in the face of a flood of false requests for connections and are therefore vulnerable to denial of service attacks.

FIG. 1 is a block diagram of an example system 100 that may protect a server 102 from denial of service attacks and may allow the server 102 to process requests from established connections to requesting client computers and allow some new valid requests from requesting client computers. A network 112 may provide responses and requests according to the HTTP based application RFC protocol in this example, but the principles discussed herein are not limited to this example and can include other application protocols such as non-TCP standards with similar characteristics. The system 100 may include a series of one or more client computers 104, 106 and 108, and a network protection module 110 coupling the client computers 104, 106 and 108 through the network 112. In this example, the network 112 is the Internet. The client computers 104, 106 and 108, in this example, may run web browsers which may provide an interface to make requests to different web server based applications via the network 112. A series of web based applications may run on the server 102 that allow the transmission of data that is requested by the client computers 104, 106 and 108. The server 102 may provide data in response to requests directed toward the respective applications on the server 102 from the client computers 104, 106 and 108. As per the TCP, packets may be sent to the server 102 from the requesting client computers 104, 106 and 108 to establish a connection or to send data for an existing connection. It is to be understood that the server 102 may be hardware or software or may represent a system with multiple servers which may include internal or external networks. In this example the server 102 may be any version of Microsoft® IIS servers or Apache® servers, although other types of servers may be used. Further, additional servers may be coupled to the network 112 and many different types of applications may be available on servers coupled to the network 112.

The network protection module 110 may be interposed between the client computers 104, 106 and 108 and the processor of the server 102 as shown in FIG. 1. The network protection module 110 may establish connections between the client computers 104, 106 and 108 and the server 102. It is to be understood that the network protection module 110 may take the form of a network card that is installed inside a computer, or it may be an embedded component as part of a computer motherboard, a router or printer interface, or a USB device that may be internal or external to the server 102. An example of a network interface controller that may serve as the network protection module 110 is a performance blade including a high speed bridge contained in the VIPRON™ application delivery controller product available from F5 Networks, Inc. of Seattle, Wash., although other network interface controllers could be used.

As will be detailed below, the network protection module 110 may receive packets 114 that may include one or more requests for the server applications running on server 102 from the client computers 104, 106 and 108. The packets 114 may be routed from the client computers 104, 106 and 108 to the server 102 via a router 116.

In this example, the request may be a SYN command that is set in the header of the packet. The SYN command may request a connection between the server 102 and the requesting computer such as client computers 104, 106 and 108. The packets 114 may include a header that provides certain identification data from the requesting client computer 104. Based on the presence of the SYN command in the packet header, the network protection module 110 may determine whether the incoming requests relate to an existing connection to the server 102 or is a request for a new connection.

Figure 3:
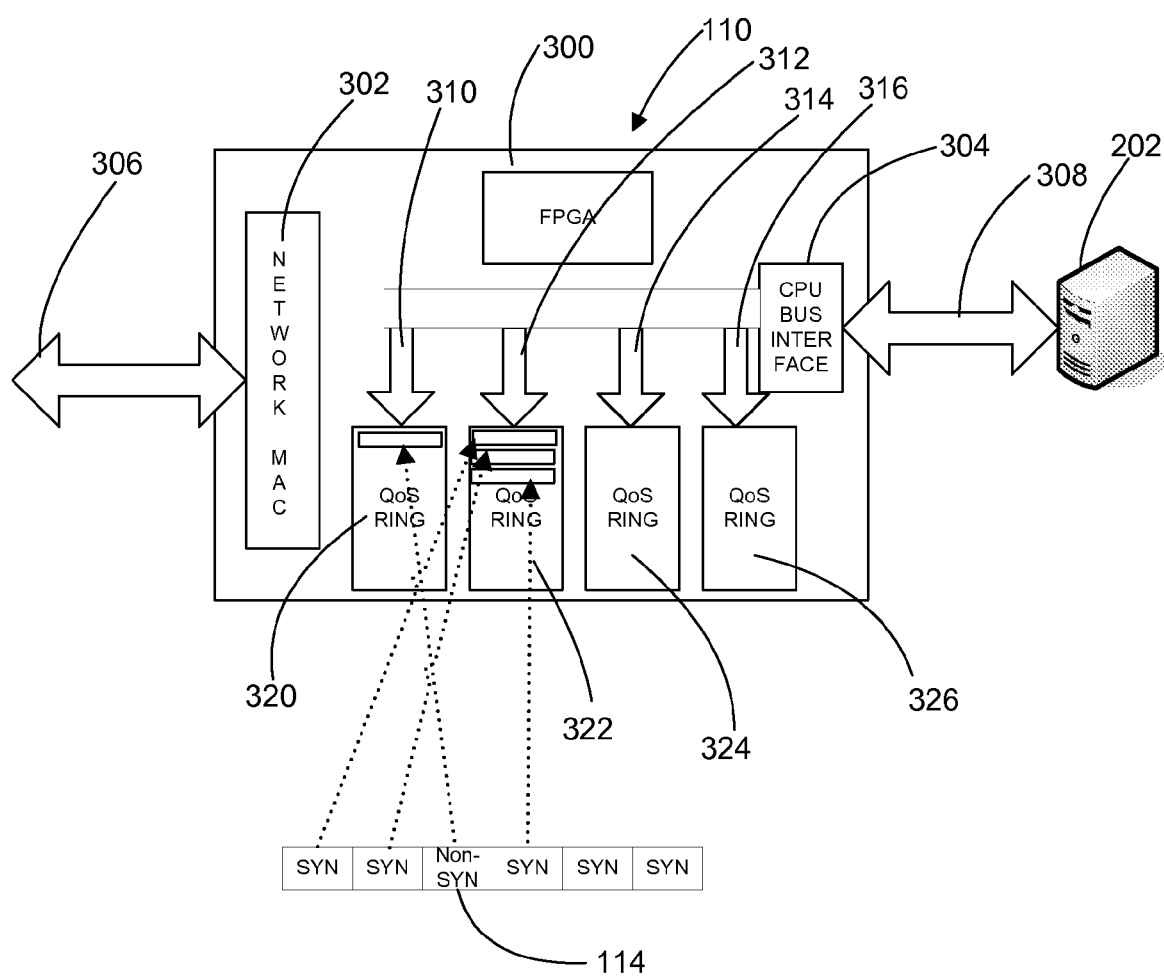
FIG. 3 is a block diagram of a network protection module that implements DMA based protection against denial of service attacks in the network system of FIG. 1.

FIG. 3 is a block diagram of the network protection module 110 that may have the ability to protect the server 102 from denial of service attacks described below. In this example, the network protection module 110 may be included in a performance blade having a high speed bridge that may be implemented in specialized hardware for maximum execution speeds. In this example, the network protection module 110 may be implemented in a Xilinx® field programmable gate array (FPGA) 300. Of course other hardware and/or software may be used for the network protection module 110. The network protection module 110 in this example may include a network port 302 and a CPU bus interface 304 that may be a hyper-transport interface. The port 302 may be and Ethernet port coupled to an Ethernet connection 306 that in this example may be a 10 Gigabit Ethernet connection. The Ethernet connection 306 may provide communication with the network 112 via the router 116 in FIG. 1. The CPU bus interface 304 in this example may be coupled to a hyper transport bus 308 that may be coupled to the internal components of the server 102 in FIG. 1. The network protection module 110 in this example may have four DMA channels 310, 312, 314 and 316. Each of the DMA channels 310, 312, 314 and 316 may have a respective Quality of Service (QoS) return ring 320, 322, 324 and 326 that may be implemented as a buffer memory. The network protection module 110 uses strict priority scheduling discipline to select the order in which the QoS return rings 320, 322, 324 and 326 are serviced by the server 102.

As will be further explained, the network protection module 110 may use the QoS return rings 320, 322, 324 and 326 to provide protection against denial of service attacks to the server 102. The network protection module 110 may receive packets over the network 112 directed to the server 102 in FIG. 1. The network protection module 110 may determine whether the packets are associated with an established connection to the server 102. The network protection module 110 may separate the packets associated with the established connection for processing by the server 102 in a first buffer associated with the first QoS return ring 320. The network protection module 110 may separate the packets requesting a new connection in a second buffer associated with the second QoS return ring 322. Based on direction of the network protection module 110, the server 102 may service the packets in the second buffer requesting a new connection at a lower priority than the packets relating to established connections.

The use of the FPGA 300 in this example may result in rapid response and determination of packets in contrast to software based application running on a general processor. The packets 114 may be received and the network protection module 110 may read the packet header and identify the packet as either being a non-SYN packet (relating to an established connection between a client computer and the server 102) or a SYN packet (requesting a connection to the server 102). The network protection module 110 may stamp the header of the non-SYN packets with a first QoS setting and may stamp the header of the SYN packets with a second QoS setting. The network protection module 110 may then map the packets with the first QoS setting to the QoS return ring 320. The packets with the second QoS setting may then be mapped to the QoS return ring 322.

The requests from the QoS return ring 320 may be granted higher priority then the requests in the QoS return ring 322. This mapping may separate the non-SYN traffic from SYN traffic. The non-SYN traffic representing existing connections may be serviced preferentially by the server 102 under the direction of the network protection module 110.

In the case of a SYN based denial of service attack, the server 102 may first service packets relating to existing connections via the QoS return ring 320. The server 102 therefore gives higher priority to the packets in the buffer of the QoS return ring 320. The server 102 may then service requests for new connections via the QoS return ring 322. In the case of an attack, excess requests for new connections in the form of SYN packets or excess new connections may back up in the buffer associated with the QoS return ring 322. The buffer associated with the QoS return ring 322 may be configured to be drop enabled so excessive SYN packets will eventually be dropped so the buffer may store additional incoming SYN packets. The buffer associated with the QoS return ring 322 may be sized to be relatively small in relation to the buffer of the QoS return ring 320. The relatively small size of the buffer of the QoS return ring 322 may insure that the number of accumulated stale SYN packets may be controlled and ultimately dropped.

The drops may be implemented by tail drop, head drop, and (weighted) random early drop methods, but other drop methods may be used. In this example, the tail drop method may be used which drops the most recently received packets. Alternatively, the head drop method may be used which drops the packets in the order that the packets are received preventing interference with the ability of the server 102 to serve requests relating to existing connections. Thus, the first packets received in the buffer associated with the QoS return ring 322 will be the first packets that are dropped from the buffer. Alternatively, a random early drop may be used where random packets in the buffer associated with the QoS return ring 322 are dropped when the buffer overflows. The random drop selection may be weighted to provide some level of probability that packets with legitimate requests for a new connection may be fulfilled by the server 102.

In this example, a further level of protection may be provided by the third QoS return ring 324. Since SYN packets with identical sending addresses may be indicative of an attacking source, packets received by the QoS return ring 322 are examined by the network protection module 110. The packets that include a sending address that is identical to other SYN packets may be further diverted from the QoS return ring 322 and mapped to the QoS return ring 324. The processing of the SYN packets in the QoS return ring 324 may be given lower priority than the processing of SYN packets in the QoS return ring 322. In this manner, legitimate requests for connection may have a better chance of being processed by the server 102 in due course by the network protection module 110.

Another alternative mechanism may be the provision of a data table in a memory of the network protection module 110 or other memory that may be accessible to the network protection module 110. The data table may store the network addresses of packets that continually request new connections with the server 102. Network addresses may be stored after a certain predetermined number of SYN requests over a set period of time are received from a specific network address. Alternatively, network addresses may be stored after the network protection module 110 determines that the packet is a false address evidencing a SYN based attack. The data in the data table may be used by the network protection module 110 to intelligently drop received packets from suspect network addresses thus facilitating the servicing of legitimate connection requests from other packets.

The above process and implementation therefore may be used to guarantee a certain level of performance of the server 102 despite a denial of service attack by setting a higher priority for packets relating to existing connections to the server 102. The process described above may provide protection against both stateful and stateless attacks.

Each of the server 102, network protection module 110, and client computers 104, 106 and 108 may include a central processing unit (CPU), controller or processor, a memory, and an interface system which are coupled together by a bus or other link, although other numbers and types of each of the components and other configurations and locations for the components can be used. The processors in the server 102, network protection module 110, and client computers 104, 106 and 108 may execute a program of stored instructions for one or more aspects of the methods and systems as described herein, including for protecting the server from a denial of service attack, although the processor could execute other types of programmed instructions. The memory may store these programmed instructions for one or more aspects of the methods and systems as described herein, including the method for protecting the server against denial of service attacks, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the server 102, network protection module 110, and client computers 104, 106 and 108 are described and illustrated herein in connection with FIGS. 1 and 3, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The operation of the example protection against denial of service attacks, shown in FIG. 3, which may be run on the network protection module 110, will now be described with reference to FIG. 1 in conjunction with the flow diagram shown in FIG. 4. The flow diagram in FIG. 4 is representative of example machine readable instructions for implementing the network protection module 110 and/or the protection process. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the network protection module 110 could be implemented by software, hardware, and/or firmware. Also, some or all of the machine readable instructions represented by the flowchart of FIG. 4 may be implemented manually. Further, although the example algorithm is described with reference to the flowchart illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In FIG. 4, a packet may be initially received from the network 112 by the network protection module 110 via the router 116 and the Ethernet connection 306 in FIGS. 1 and 3 (400). In this example, the received packets may be in a TCP format with a header and a payload. The network protection module 110 may determine whether the SYN flag is set indicating a request for a connection (402). If the SYN flag is not set in the packet, the network protection module 110 assigns the packet to the buffer of the first QoS return ring 320 in FIG. 3 by flagging the packet for routing to the buffer of the first QoS return ring 320 (404). The server 102 then processes the request in the packet (406) via the DMA channel 310 when processing resources are available on the server 102. The network protection module 110 sets the highest priority to the packets on the QoS return ring 320 and thus packets associated with existing connections have a guaranteed level of service from the server 102.

After receiving a packet flagged as a SYN request, the network protection module 110 may read the address of the client computer requesting a connection and compare the network address with a table of network addresses of previous packets received over a limited period of time (408). If the network address is the same, this may be evidence that a denial of service attack is being launched from the network address sending the packet. If the address is not in the table, the address is stored in the table (410) for further analysis and protection from future denial of service attacks originating from the network address. If the address is stored in the table, indicating a SYN request was previously received from that address, the table may be updated with priority data relating to the address (412). In this example, the table may be a per-address (or per address group) aging table that may increment on every SYN request and decrement at some rate that rate limits (to a lower priority queue) SYN requests from that address or set of addresses. As will be explained, the table operates on a token bucket system per address or set of addresses that deprioritizes to the third QOS ring 324 in FIG. 3 when a threshold is exceeded.

After the new address is stored in the table (410) or after the table is updated (412) the data in the table may be used to determine if a priority threshold is exceeded (414). Based on the address and the comparison to the table to determine the threshold level, the packet may be flagged and routed to the buffer of the second QoS ring 322 in FIG. 3 if the priority threshold is not exceeded (416). In this example, the server 102 may provide limited processing resources to packets on the QoS ring 322 and therefore processes the packets on the second QoS ring 322 at a lower priority than the packets on the first QoS ring 320. Successful processing of a packet from the second QoS ring 322 may establish a new connection between the server 102 and the requesting client computer that sent the packet with the SYN flag.

The packet may be flagged by the network protection module 110 and a comparison may be made with the priority data in the table to determine if a minimal priority threshold is met (418). If the minimal priority threshold is not met, indicating an attack based on the number of attempts from the address, the packet is dropped (420). If the minimal priority threshold is met, the packet is put in the buffer for the third QoS ring 324 (422). The server 102 may process packets from the third QoS ring 324 when resources are available (424). However, the server 102 processes requests for the third QoS ring 324 at a lower priority then requests on the second QoS ring 322.

The network protection module 110 may periodically determine whether drops of packets in the second QoS ring 322 should be made in order to allow for new packets to be placed in the second QoS ring 322 by determining whether the buffer is full (426). If a packet drop is necessary, the network protection module 110 drops packets from the QoS ring 322 (428) therefore freeing up the buffer for receiving new packets. In this example, a tail drop method may be used where the most recent packets are dropped first. As explained above, a head drop method may be used where the packets are dropped in the order that they are placed in the QoS ring 322. Alternatively, the packets may be drop enabled randomly in order to increase the chances that legitimate connection requests may be fulfilled by the server 102. The server 102 processes packets from the second QoS ring 324 when resources are available (430).

It is to be understood that the example processes described above may be used for network protection of a network with a non-TCP protocol. Any protocol that has the equivalent of the TCP SYN command for the creation of a new connection may use the above described processes. Any such non-TCP protocol may have processing costs of a new connection that is higher than other packets and the sequence of processing of the new connection packet is independent of previous packets. Finally, successive packets may be dependent on a request for a new connection but can arrive and be processed by the server only after processing the request for the new connection. An alternate process would only have one request for connection and proceed immediately with succeeding packets relating to data. In this case, the process would track which connections have not yet been processed and queue any succeeding packets into a dependent ring until the connection packet is processed and therefore the packets are then processed from the ring.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for protection against denial of service attacks to a server the method comprising:
   receiving one or more TCP/IP packets over the network, at a network management device, wherein the packets are directed to a server;
   determining, by the network management device, a presence of a SYN parameter within each of the received one or more TCP/IP packets;
   assigning, by the network management device, the received one or more TCP/IP packets with the determined presence of the SYN parameter to a lower priority buffer and the received one or more TCP/IP packets without the determined presence of the SYN parameter to a higher priority buffer; and
   prioritizing, by the network management device, service of the received one or more TCP/IP packets assigned to the higher priority buffer over the received one or more TCP/IP packets assigned to the lower priority buffer;
   reading, by the network management device, source data associated with the received one or more TCP/IP .packets, the source data comprising a network address of a computer sending the received one or more TCP/IP packets;
   determining, by the network management device, whether the assigned TCP/IP packets with the determined presence of SYN parameter requesting the new connection with the server are associated with a network address of the computer previously requesting the new connection;
   assigning, by the network management device, the assigned one or more TCP/IP packets with the determined presence of SYN parameter requesting the new connection from the lower priority buffer to a least priority buffer when the assigned one or more TCP/IP packets with the determined presence of SYN parameter are determined to be associated with the network address of the computer previously requesting the new connection and
   prioritizing, by the network management device, service of the assigned one or more TCP/IP packets assigned to the lower priority buffer over the assigned one or more TCP/IP packets assigned to the least priority buffer.

2. The method of claim 1, further comprising storing by the network management device, the network addresses of the assigned one or more TCP/IP packets repeatedly requesting the new connection in a network database.

3. The method in claim 1, further comprising, dropping, by the network management device, the assigned one or more TCP/IP packets in the lower priority buffer using one or more packet dropping techniques after a predetermined period of time when the assigned one or more TCP/IP packets in the lower priority buffer packets are not processed by the server.

4. The method in claim 3, wherein the one or more packet dropping techniques comprises a tail drop technique, a head drop technique, a random early drop technique or a weighted random early drop technique.

5. The method of claim 1, further comprising:
   reading, by the network management device, source data associated with the received one or more TCP/IP packets, the source data comprising a network address of a computer sending the received one or more TCP/IP packet;
   determining, by the network management device, the network address of the received one or more TCP/IP packets with the determined presence of SYN parameter requesting a plurality of new connections; and
   storing the network management device, the determined network address of the received one or more TCP/IP packets with the determined presence of SYN parameter requesting the plurality of new connections in a-network-table.

6. A non-transitory computer readable medium having stored thereon instructions for protecting against denial of service attack comprising machine executable code which when executed by at least one processor, causes the processor to perform steps comprising:
   receiving one or more TCP/IP packets directed to a server;
   determining, by the network management device, a presence of a SYN parameter within each of the received one or more TCP/IP packets;
   assigning the received one or more TCP/IP packets with the determined presence of the SYN parameter to a lower priority buffer and the received one or more TCP/IP packets without the determined presence of the SYN parameter to a higher priority buffer; and
   prioritizing service of the received one or more TCP/IP packets assigned to the higher priority buffer over the received one or more TCP/IP packets assigned to the lower priority buffer
   reading source data associated with the received one or more TCP/IP packets, the source data comprising a network address of a computer sending the received one or more TCP/IP packets;
   determining whether the received TCP/IP packets with the determined presence of SYN parameter requesting the new connection with the server are associated with a network address of the computer previously requesting the new connection;

assigning the received one or more TCP/IP packets with the determined presence of SYN parameter requesting the new connection from the lower priority buffer to a least priority buffer when the received one or more TCP/IP packets with the determined presence of SYN parameter are determined to be associated with the network address of the computer previously requesting the new connection; and prioritizing service of the received one or more TCP/IP packets with the determined presence of the SYN parameter assigned to the lower priority buffer over the received one or more TCP/IP packets with the determined presence of the SYN parameter assigned to the least priority buffer.

7. The medium of claim 6 further comprising, storing the network addresses of the received one or more TCP/IP packets with the determined presence of SYN parameter repeatedly requesting the new connection in a network database.

8. The medium of claim 6 further comprising, dropping the assigned one or more TCP/IP packets in the lower priority buffer using one or more packet dropping techniques after a predetermined period of time when the assigned one or more TCP/IP packets in the lower priority buffer are not processed by the server.

9. The medium of claim 8, wherein the one or more packet dropping techniques comprises a tail drop technique, a head drop technique, a random early drop technique or a weighted random early drop technique.

10. The medium of claim 7, further comprising:
reading source data associated with the received one or more TCP/IP packets, the source data comprising a network address of a computer sending the received one or more TCP/IP packets;
determining the network address of the received one or more TCP/IP packets with the determined presence of SYN parameter requesting a plurality of new connections; and
storing the determined network address of the received one or more TCP/IP packets with the determined presence of SYN parameter for the plurality of new connections in a network table.

11. A network management device comprising:
at least one of configurable hardware logic configured to be capable of implementing or a processor coupled to a memory and configured to execute programmed instructions stored in the memory comprising:
receiving one or more TCP/IP packets directed to a server;
determining, by the network management device, a presence of a SYN parameter within each of the received one or more TCP/IP packets;
assigning the received one or more TCP/IP packets with the determined presence of the SYN parameter to a lower priority buffer and the received one or more TCP/IP packets without the determined presence of the SYN parameter to a higher priority buffer; and
prioritizing service of the received one or more TCP/IP packets assigned to the higher priority buffer over the received one or more TCP/IP packets assigned to the lower priority buffer
wherein the at least one of configurable hardware logic configured to be capable of implementing or the processor coupled to the memory and configured to execute programmed instructions stored in the memory further comprising:
reading source data associated with the received one or more TCP/IP packets, the source data comprising a network address of a computer sending the received one or more TCP/IP packets;
determining whether the received TCP/IP packets with the determined presence of SYN parameter requesting the new connection with the server are associated with a network address of the computer previously requesting the new connection;
assigning the received one or more TCP/IP packets with the determined presence of SYN parameter requesting the new connection from the lower priority buffer to a least priority buffer when the received one or more TCP/IP packets with the determined presence of SYN parameter are determined to be associated with the network address of the computer previously requesting the new connection; and
prioritizing service of the received one or more TCP/IP packets with the determined presence of the SYN parameter assigned to the lower priority buffer over the received one or more TCP/IP packets with the determined presence of the SYN parameter assigned to the least priority buffer.

12. The device as set forth in claim 11 wherein the at least one of configurable hardware logic configured to be capable of implementing or the processor coupled to the memory and configured to execute programmed instructions stored in the memory further comprising storing the network addresses of the received one or more TCP/IP packets with the determined presence of SYN parameter repeatedly requesting the new connection in a network database.

13. The device as set forth in claim 11 wherein the at least one of configurable hardware logic configured to be capable of implementing or the processor coupled to the memory and configured to execute programmed instructions stored in the memory further comprising dropping the assigned one or more TCP/IP packets in the lower priority buffer using one or more packet dropping techniques after a predetermined period of time when the assigned one or more TCP/IP packets in the lower priority buffer are not processed by the server.

14. The device as set forth in claim 13 wherein the one or more packet dropping techniques comprises a tail drop technique, a head drop technique, a random early drop technique or a weighted random early drop technique.

15. The device as set forth in claim 12 wherein the at least one of configurable hardware logic configured to be capable of implementing or the processor coupled to the memory and configured to execute programmed instructions stored in the memory further comprising:
reading source data associated with the received one or more TCP/IP packets, the source data comprising a network address of a computer sending the received one or more TCP/IP packets;
determining the network address of the received one or more TCP/IP packets with the determined presence of SYN parameter requesting a plurality of new connections; and
storing the determined network address of the received one or more TCP/IP packets with the determined presence of SYN parameter for the plurality of new connections in a network table.

* * * * *